Nov. 10, 1925.  
G. A. McMENIMEN  
1,560,834  
TOOL HOLDER AND TOOL OR IMPLEMENT THEREFOR  
Filed Aug. 29, 1924
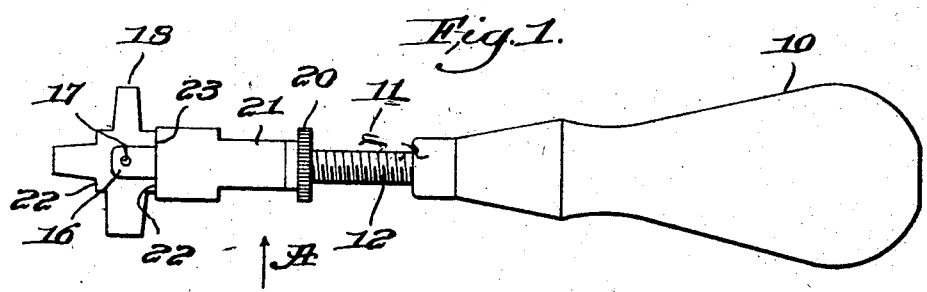
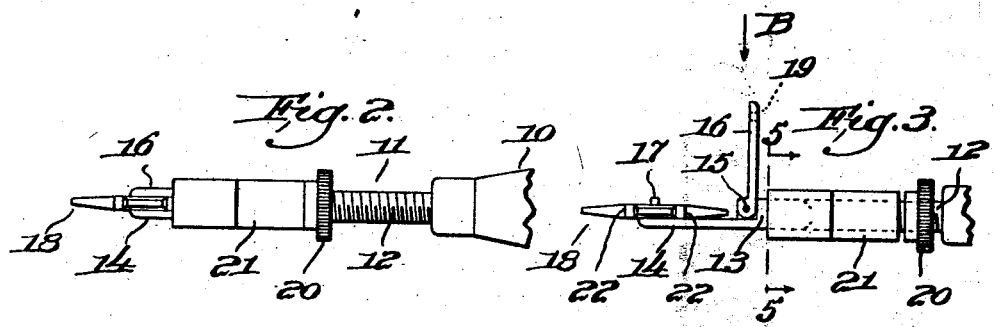
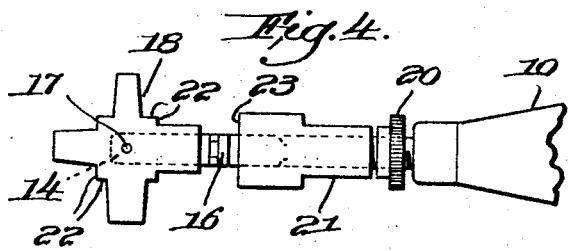 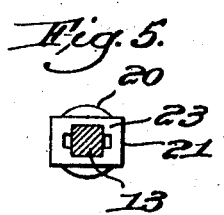
Inventor:  
George A. McMenimen,  
by Edward F. Allen.  
his Atty.

Patented Nov. 10, 1925.

1,560,834

UNITED STATES PATENT OFFICE.

GEORGE A. McMENIMEN, OF SOMERVILLE, MASSACHUSETTS.

TOOL HOLDER AND TOOL OR IMPLEMENT THEREFOR.

Application filed August 29, 1924. Serial No. 734,883.

*To all whom it may concern:*

Be it known that I, GEORGE A. MCMEN-IMEN, a citizen of the United States of America, and a resident of Somerville, in the county of Middlesex and Commonwealth of Massachusetts, have invented certain new and useful Improvements in a Tool Holder and Tool or Implement Therefor, of which the following is a specification.

This invention relates to a tool holder and tool or implement therefor, and more particularly to one wherein the implement may be shifted in the holder to present different operative portions in succession or as desired for the work at hand.

It is an object of the invention to produce a device of the above class that is inexpensive to manufacture, serviceable, and which may have a plurality of operative portions any one of which may be readily adjusted for use.

A further object of the invention is to produce a tool holder of such construction that the devices securing an implement thereto are simple and effective, and normally carried by the holder in a manner whereby they need not be separated therefrom when it becomes necessary or desirable to shift the implement, so as to present another or new operative portion for use.

Another object of the invention is to produce a holder of the above class which may be provided with an implement or tool capable of being shifted in said holder, and which implement may present a plurality of operative portions, any one of which may be put to use without shifting the implement, if the occasion or work requires.

Other objects of the invention will be fully understood from a description of the drawings and the claims hereinafter given.

Of the drawings:

Figure 1 represents a view of the device as provided with an implement having a plurality of screwdriver blades of different sizes;

Fig. 2 is a view looking in the direction of arrow A in Fig. 1;

Fig. 3 is a view similar to Fig. 2 but showing the implement securing devices withdrawn from securing position leaving the implement free to be shifted or replaced by another;

Fig. 4 is a view looking in the direction of arrow B in Fig. 3; and

Fig. 5 is a section on the line 5—5 of Fig. 3 showing the squared portion of the shank and the sleeve slidable thereon.

Like characters represent like parts throughout the several figures of the drawings.

Referring to the drawings:

The drawings herewith represent the device as fitted with an implement having a plurality of screwdriver blades of different sizes, but it will be understood that other implements might be used if desired without departing from the spirit and scope of the invention.

It will also be understood that while the device shown is intended to be manually operated, it is within the scope of the invention to apply it to power-driven machines.

The handle 10 has fixedly secured thereto a shank 11, a portion of which is threaded as at 12, and a portion flat-sided or squared as at 13, which portion is reduced as at 14 to form a leg and has provision for a pivot 15 about which a lid or clamp member 16 is adapted to swing.

The portion 14 has a stud 17 upstanding therefrom on which an implement 18 may be mounted and about which it may be turned, and which is adapted to enter a hole 19 in the clamp member 16.

Threaded to engage the shank portion 12 is a nut 20, and slidably mounted on the squared portion 13 of the said shank is a sleeve 21 which is arranged to be slid over the reduced portion 14 and clamp member 16 when the implement 18 is in position for use, as seen in Figs. 1 and 2.

The said implement, in the present instance, is provided with a plurality of squared portions or shoulders 22 against which the sleeve end 23 is or may be forced by the nut 20, to thereby firmly secure it in operative position.

To shift the implement about its pivot 17, the nut 20 will be turned back on the threaded portion 12 sufficiently to allow the sleeve 21 to be moved in the same direction to free it from the blade it previously enclosed, whereupon the implement may be swung in the desired direction to present the portion intended for use, and without swinging the clamp member 16 on its pivot.

When the implement has been adjusted, the sleeve will be slid towards it until the end 23 meets the shoulders 22, and thereafter the nut 20 will be turned to lock the said sleeve tightly in place.

To replace the implement by another, the same action will take place excepting that it then becomes necessary to swing the member 16 on its pivot in order to remove the implement, as seen in Fig. 3.

Having described the invention I claim:

1. In a device of the class described, a shank having a threaded portion, a smooth portion, and a reduced end, said end having a pivot thereon to receive an implement; means coacting with said reduced end to retain an implement on said pivot, means to normally partially house said reduced end and said first means, and means to lock said second means in housing position.

2. In a device of the class described, a shank having a rigid leg and a pivoted lid at the end thereof arranged to be normally parallel and in spaced relation to receive an implement therebetween; means to pivotally mount an implement between said leg and lid, means to partially house said leg and lid whereby they may be held in implement retaining position, and means to lock said second means in housing position.

3. In a device of the class described, a shank having a reduced portion at the end thereof, means to pivotally mount an implement on said reduced portion, a movable member arranged to coact with said reduced portion to retain an implement mounted thereon in position, a slidable member arranged to coact with said first member to retain an implement in position, means to lock said second member against movement; and an implement pivotally and removably mounted on said reduced end and having a plurality of shoulders against which said movable member is arranged to bear to thereby prevent rotary movement of said implement.

4. In a device of the class described, a shank having a reduced end, a squared portion, and a threaded portion; a pivot mounted on said reduced portion for the reception of an implement, a hinged member mounted on said shank and adapted to coact with said reduced portion to retain an implement on said pivot, a sleeve slidably mounted on and surrounding said squared portion, a nut on said threaded portion; and an implement rotatably mounted on said pivot and having a plurality of work-engaging portions, and a plurality of shoulders arranged to be engaged by said sleeve for the purpose of preventing rotation of said implement.

Signed by me at Boston, Mass., this 28th day of August, 1924.

GEORGE A. McMENIMEN.